United States Patent Office 2,875,097
Patented Feb. 24, 1959

2,875,097

PARASITICIDES, THEIR PREPARATION AND USE

James E. Pritchard, Bartlesville, Okla., assignor to Phillips Petroleum Company, a corporation of Delaware No Drawing. Application September 7, 1954
Serial No. 454,616

15 Claims. (Cl. 117—138.5)

This invention relates to reaction products of heterocyclic nitrogen base polymers and phenols as new compositions of matter, their preparation, a process for applying them to absorbent materials such as fabrics, and to the compositions resulting therefrom. Materials thus treated are rendered resistant to attack by fungi, insects, bacteria, and other similar organisms, and, in addition, are rendered water repellent.

Phenols are well-known fungicides and bactericides. Fabrics impregnated with particular members of this class of compounds show a high degree of mildew resistance, but, because of the ease with which these compounds are removed upon exposure to moisture and weathering conditions, the effect is not lasting. It has now been found that compounds formed by the reaction of these phenols with a heterocyclic nitrogen base polymer unexpectedly retain the fungicidal and fungistatic properties of the phenols. When used as textile treating agents they have the advantage of being retained in the fabric during exposure to moisture and weathering conditions for much longer periods of time than the phenols alone. In addition, they impart to the fabrics treated with them a high degree of water repellency. The ability of polymers of vinyl-substituted pyridine and quinoline to render fabrics and other porous materials water repellent is set forth in greater detail in applicant's copending applications Serial No. 274,660, filed March 3, 1952, now U. S. Patent 2,702,763, and Serial No. 284,448, filed April 25, 1952, now abandoned.

One object of this invention is to provide fungicidal and insect-repellent compositions as reaction products of phenols and heterocyclic nitrogen base polymers. A further object is to provide a method of preparing such compositions. Another object is to provide a material impregnated with the compositions of this invention and thereby rendered waterproof as well as resistant to fungi and insects. Another object is to provide a method for impregnating an absorbent material with the compositions of this invention.

The products which are within the scope of this invention include insoluble addition compounds or complexes formed by the interaction of a polymer of a vinyl-substituted heterocyclic nitrogen base with a phenol. Although the formation of insoluble phenol complexes is a well known reaction characteristic of pyridine, its homologs and derivatives, and of certain other heterocyclic compounds, as shown, e. g., by Elderfield "Heterocyclic Compounds," vol. 1 (1950), p. 412, the exact nature of the products is not known. It is believed, however, that the reaction can be illustrated by the following structural formulae, using a portion of the molecule produced by polymerizing a 2-methyl-5-vinyl pyridine (MVP). ArOH is the phenol where Ar is an aryl radical, substituted or unsubstituted.

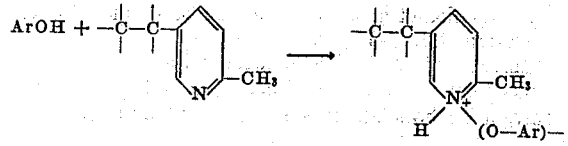

Note that the pyridine nucleus in the polymer behaves similarly to pyridine. The same is true of quinoline polymers.

New compositions of this invention are prepared from polymers of heterocyclic nitrogen bases of the pyridine and quinoline series containing a vinyl or alpha-methylvinyl group. Homopolymers, copolymers, terpolymers, etc., all produce valuable products. By the term "polymers of heterocyclic nitrogen bases," as used throughout this specification and the claims, I mean any homopolymers, copolymers, terpolymers, etc., of heterocyclic nitrogen bases. Monomers copolymerizable with these heterocyclic nitrogen bases include compounds containing an active $CH_2=C<$ group. Examples of such compounds which are widely used include styrene, substituted styrenes such as alkyl, alkoxy, and halogenated styrenes, acrylonitrile, methacrylonitrile, methyl acrylate, methyl methacrylate, ethyl acrylate, butyl acrylate, conjugated dienes, and the like. Also, polymers can be prepared from various mixtures of these heterocyclic nitrogen bases containing a vinyl or alpha-methylvinyl group, one or more conjugated dienes, and one or more polymerizable materials containing the vinyl or alpha-methylvinyl group set forth above.

The polymeric starting materials can range from liquid to rubbery to solid resinous materials, depending upon the monomers employed and the method of preparation. For example, copolymers of a conjugated diene with a vinylpyridine, when prepared by emulsion polymerization, can range from liquid to rubbery products, depending upon the amount of modifier employed in the polymerization recipe.

The heterocyclic nitrogen bases which are applicable for the production of the polymeric starting materials are those of the pyridine and quinoline series which are copolymerizable with a conjugated diene and contain at least one

substituent wherein R is either hydrogen or a methyl group, i. e., the substituent is either a vinyl or an alpha-methylvinyl (isopropenyl) group. It is preferred that only one substituent of this type be present and that pyridine be the base instead of quinoline. Various alkyl-substituted derivatives are also applicable but it is generally preferred that the total number of carbon atoms in the nuclear substituted alkyl groups should not be greater than 12 and most frequently these alkyl substituents are methyl and/or ethyl.

The heterocyclic nitrogen bases are those having the formula

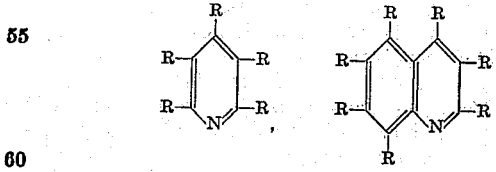

or

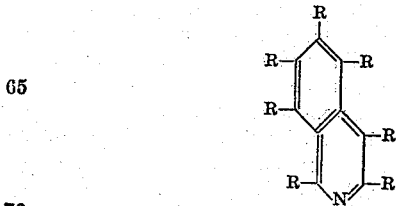

where R is selected from the group consisting of hydrogen, alkyl, vinyl, alpha-methylvinyl, nitro, alkoxy, halo, hydroxy, cyano, aryloxy, aryl, and combinations of these groups such as haloalkyl, alkylaryl, hydroxyaryl, and the like; at least one and not more than two of said groups being selected from the group consisting of vinyl and alpha-methylvinyl; and the total number of carbon atoms in the nuclear substituted groups being not greater than 12, in addition to those carbon atoms in the vinyl and/or alpha-methylvinyl groups. Examples of such compounds are 2-vinylpyridine; 2-vinyl-5-ethylpyridine; 2,5-divinylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5(alpha-methylvinyl)pyridine; 3,5-di(alpha-methylvinyl)pyridine; 3-nitro-2-vinylpyridine; 2-vinyl-4-hydroxy-5-nitropyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl) pyridine; 3-vinyl-5-phenylpyridine; 2-(para-methylphenyl)-3-vinyl-4-methylpyridine; 3-vinyl-5-(hydroxyphenyl)pyridine; 2-vinylquinoline; 2-vinyl-4-ethylquinoline; 3-vinyl-6,7-di-n-propyl-quinoline; 2-methyl-4-nonyl-6-vinylquinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 1-vinyl-6-ethoxy-7-methylquinoline; 3-vinyl-6-hydroxymethylisoquinoline; and the like.

The conjugated dienes employed are preferably those which contain from four to six, inclusive, carbon atoms per molecule and include 1,3-butadiene, isoprene, piperylene, methylpentadiene, 2,3-dimethyl-1,3-butadiene, chloroprene, and others. However, conjugated dienes having more than six, such as eight, carbon atoms per molecule can also be used. Furthermore, various alkoxy, such as methoxy and ethoxy, and cyano derivatives of these conjugated dienes, are also applicable. In fact, it has been found that when dealing with fabrics such copolymers are more water repellent than the homopolymers described above. The explanation is that the heterocyclic nitrogen bases are water-soluble whereas such olefins as butadiene are water-insoluble. Hence, the higher the content of heterocyclic base in relation to diolefin the greater the water-solubility of the polymer, and hence the lower is its water-repellency. Conversely, the greater the ratio of diolefin to heterocyclic base the greater the water-repellency of the polymer. The conjugated diene component of the copolymer not only imparts water-repellency, but also gives greater flexibility, while the pyridine or quinoline derivative imparts low oil solubility to the product. I use from 25 to 75 parts by weight of the conjugated diolefin and from 75 to 25 parts by weight of the heterocyclic nitrogen base. A specific example of a copolymer which imparts excellent water repellency characteristics to a fabric is a 50/50 butadiene/2-methyl-5-vinylpyridine copolymer.

The term "phenols" as used throughout the case is meant to cover any monocyclic or polycyclic aromatic compounds containing one or more hydroxy groups attached to the carbon atoms of the nucleus as well as any additional substituent groups which do not interfere with the formation of the insoluble heterocyclic nitrogen base-phenol complex. Substituents such as chlorine atoms often increase the fungicidal and fungistatic qualities of the phenol. Examples of such phenols include phenol per se, cresol, halophenols such as monochlorophenol, dichlorophenol, and trichlorophenol; nitrophenol, aminophenol, guaiacol, anol, eugenol, isoeugenol, saligenin, carvacrol, thymol, o-hydroxyacetophenone, p-hydroxyacetophenone, o-hydroxydiphenyl, p-hydroxydiphenyl, o-cyclohexylphenol, p-cyclohexylphenol, catechol, resorcinol, hydroquinone, pyrogallol, hydroxyhydroquinone, phloroglucinol, phenanthrol, and naphthol. A preferred member of this class is 2,2'-methylene-bis(4-chlorophenol) known as dichlorophene which shows marked inhibition to fungi and resistance to leaching from textile.

The heterocyclic nitrogen base-phenol complex can be applied to fabric in various ways. In one method of operation, the fabric is immersed in an aqueous acidic solution of the polymer until thoroughly wetted, then squeezed or centrifuged to remove excess moisture, followed by immersion in an aqueous solution of the alkali metal salt of the phenol, whereupon the insoluble addition compound precipitates on and/or in the fabric. The fabric is then rinsed with water to remove soluble salts and other impurities, and dried.

In a preferred embodiment of this invention, the first solution comprises an aqueous acetic acid solution of a copolymer of butadiene with 2-methyl-5-vinylpyridine, and the second solution comprises an aqueous solution of a disodium derivative of 2,2'-methylene-bis(4-chlorophenol).

This reaction can be represented by the following structural formulae wherein a 2-methyl-5-vinylpyridine nucleus, forming part of a polymer, after reaction with acetic acid to make it water-soluble, is treated with the sodium salt of a phenol, represented as Ar—O—Na where Ar is an aryl nucleus, either substituted as previously described, or unsubstituted.

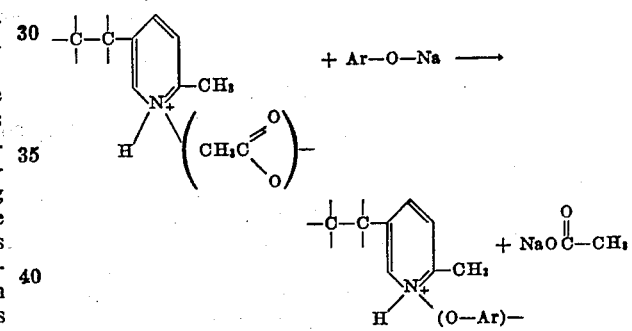

The function of the acid is to solubilize the polymer in aqueous solutions. As described above, in the case of butadiene-methylvinylpyridine polymers the water-solubility declines as the butadiene content of the polymer increases. Accordingly, the acid-solubility of the polymer likewise varies inversely with its butadiene content. These copolymers can be dissolved in aqueous acid solutions providing the butadiene component does not amount to more than about 75% by weight of the polymer.

Treatment with acid converts the basic groups in the polymer to the pyridinium or quinolinium salt. Acids which are applicable include inorganic acids such as hydrochloric, hydrobromic, hydriodic, sulfuric, nitric, and phosphoric acids, and organic acids generally containing between one and four carbon atoms per molecule such as formic, acetic, propionic, butyric, oxalic, malonic, succinic, glycolic, chloroacetic, dichloroacetic, and trichloroacetic acids. The amount and type of acid employed is dependent upon the properties desired in the final product. Generally the polymer is treated with acid sufficient to react with from 10 to 100 percent of the basic groups in the polymer and preferably from 50 to 100 percent of the basic groups in the polymer.

The aqueous acidic solution is usually made with an amount in excess of the stoichiometric amount of acid required to combine with all the amino nitrogen atoms. Less than this amount, however, can be used in some cases. With certain polymers, as little as 25 percent of the stoichiometric amount can be used and still effect solvation of the polymer.

Instead of employing aqueous solutions, organic solvents may be used if desired. Any solvent which is a solvent for both the polymer and for the phenol but is a non-solvent for the reaction product is applicable. Hydrocarbons, alcohols, ethers, and the like, can be used. In such cases, the phenol itself, rather than a phenolate, can be used. Since the polymers of this invention are soluble in organic solvents no acid-treatment is necessary as in the case of aqueous solutions.

In general, fabric is impregnated with a phenol-vinylpyridine polymer reaction product in amounts ranging from 0.1 to 10 parts by weight, preferably from 0.5 to 5 parts by weight, per 100 parts by weight of the material treated.

In preparation for the following examples butadiene/2-methyl-5-vinylpyridine copolymer was prepared by emulsion polymerization at 50° C. in accordance with the following recipe:

| | Parts by weight |
|---|---|
| Butadiene | 50 |
| 2-methyl-5-vinylpyridine | 50 |
| Water | 180 |
| Soap flakes (sodium fatty acid soap) | 5 |
| $K_2S_2O_8$ | 0.3 |
| Mercaptan blend [1] | 0.3 |

[1] A blend of tertiary $C_{12}$, $C_{14}$, and $C_{16}$ aliphatic mercaptans in a ratio of 3:1:1 parts by weight.

The latex was shortstopped at an average conversion of 68% with 0.1 part di-tert-butyl hydroquinone. As an antioxidant 2% by weight of phenyl-beta-naphthylamine based on the weight of the polymer was added. The brine-alcohol method of coagulation was used; then the polymer was washed free of soap and dried.

The polymer was dissolved in a mixture of isopropyl alcohol, acetic acid, and water to form a solution containing 1.5 weight percent of polymer, 5 weight percent of acetic acid and 10 weight percent of isopropyl alcohol. The method of preparing this solution was as follows: The polymer, cut in small pieces, was let stand about one day in contact with a mixture comprising one-half the total quantity of glacial acetic acid and isopropyl alcohol. At the end of this time, increments of the remaining alcohol and acid containing increasing amounts of water were added, with agitation, until the last addition was water alone.

A sample of 10 ounce cotton duck, which had been laundered and dry cleaned to remove any sizing or finishing oils, was immersed in a solution of the polymer, prepared as described above, long enough to effect thorough wetting. After it had been squeezed between rollers to remove excess moisture, it was then immersed in an aqueous solution of the sodium derivative of the desired phenol, whereupon an insoluble copolymer-phenol reaction product precipitated in and/or on the fabric. The fabric was then leached in water 24 hours to remove sodium acetate and other water-soluble compounds which would be removed by rain or other weather conditions. It was then dried at 60° C.

EXAMPLE 1

Samples of fabric prepared as described above were tested for mildew resistance in outdoor use by a biological method in which the fabric was exposed to a cellulose-destroying pure culture of the fungus *Chaetomium globosum* for 14 days, and then tested for reduction in breaking strength.

As described above, the impregnated fabric is first leached in water for 24 hours in order to extract water-soluble preservatives that would be removed normally by rain or other weather conditions.

A culture medium was prepared consisting of a mixture of 3 grams of $NH_4NO_3$, 2 grams of $K_2HPO_4$, 2.5 grams of $KH_2PO_4$, 2 grams of $MgSO_4.7H_2O$, 20 grams of Bacto-agar, and 1.0 liter of tap water. This culture medium, after being dissolved in an autoclave, was poured into eight ounce square bottles and sterilized for 20 minutes at 15 lbs. pressure and 120° C. The bottles were then placed on their sides. As they cooled, the agar hardened. A sterile piece of filter paper for the culture to feed upon was placed on top of the medium. Over its surface was spread 1-2 ml. of inoculum of *Chaetomium globosum* prepared by dispersing in water the scrapings from a ripe fruiting culture. The bottle and its contents were held at an incubation temperature of about 85° F. for 3 to 4 days, until a mycelial mat had developed. On top of this mat was placed a sample of cotton duck impregnated with the phenol-copolymer reaction product, over which more inoculum was spread. After 14 more days at about 85° F. the fabric was removed, washed free of fungi, dried, and tested for tensile strength at the breaking point. The results are given below:

*Resistance of impregnated fabric to Chaetomium globosum*

| Fungicide: | Average tensile strength [1] |
|---|---|
| Control (untreated fabric) | 5 |
| Copolymer-disodium 2,2'-methylene bis(4-chlorophenoxide) reaction product [2] | 98 |
| Copolymer-sodium 2,4-dinitrophenoxide reaction product | 26 |
| Atco [3] | 85 |

[1] Pounds pull per one inch width strip at breaking point.
[2] The disodium compound was obtained by reacting an equivalent amount of aqueous NaOH with the 2,2'-methylene bis(4-chlorophenol).
[3] Commercial product containing 6.6% 2,2'-methylene bis(4-chlorophenol) and 26% wax diluted with water to 3% wax content before use.

EXAMPLE 2

Samples of fabric prepared as described above were subjected to soil burial tests at room temperature in order to determine their resistance to attack by fungi and other soil microorganisms. This test consisted in measuring the reduction in tensile strength at the breaking point after the fabric had been buried in soil for 30 days. The deterioration under outdoor exposure conditions was also determined by measuring the reduction in tensile strength at the breaking point after the fabric had been exposed to atmospheric conditions for 30 days. The results are given below:

*Soil burial and weathering tests*

| Fungicide | Tensile [1] Strength After— | | |
|---|---|---|---|
| | No Exposure (Original) | 30 days Soil Burial | 30 days Weathering |
| Control (Untreated Fabric) | 119 | 46 | 95 |
| Copolymer-disodium 2,2'-methylene-bis(4-chlorophenoxide) reaction product [2] | 117 | 100 | 111 |

[1] Pounds pull per one inch width strip.
[2] The disodium compound was obtained by reacting an equivalent amount of aqueous NaOH with the 2,2'-methylene-bis(4-chlorophenol)

EXAMPLE 3

The water repellency of fabric prepared as described above was demonstrated by means of the water spray test. In this test, a specimen, stretched tightly in a six-inch embroidery hoop, is held at a 45° angle six inches below a standard spray head. After pouring 250 cc. of water through the spray head the fabric is rated with respect to its water repellency. Ratings are made on a scale of zero to 100 where zero represents complete wetting of upper and lower surfaces and 100 represents complete absence of wetting. A rating of 50 indicates complete wetting of upper fabric surface, 70 signifies partial wetting of upper surface, 80 represents partial wetting to give a sharp spray-head pattern, and 90 indicates slight random wetting of upper surfaces. The results are shown below:

*Water repellency of fabric*

| | Spray test rating |
|---|---|
| Control (untreated fabric) | 70 |
| Copolymer-disodium 2,2'-methylene-bis (4-chlorophenoxide) reaction product [1] | 80 |

[1] The sodium compound was obtained by reacting an equivalent amount of aqueous NaOH with the 2,2'-methylene-bis(4-chlorophenol).

EXAMPLE 4

A 2-methyl-5-vinylpyridine polymer was prepared by emulsion polymerization at 50° C., using the following recipe:

| | Parts by weight |
|---|---|
| 2-methyl-5-vinylpyridine | 100 |
| Water | 180 |
| Soap flakes (sodium fatty acid soap) | 5 |
| $K_2S_2O_8$ | 0.3 |
| Mercaptan blend [1] | 0.3 |

[1] A blend of tertiary $C_{12}$, $C_{14}$, and $C_{16}$ aliphatic mercaptans in a ratio of 3:1:1 by weight.

The product was dissolved in acetic acid, precipitated with 1% NaOH, washed with water, and dried.

A sample of this polymer was dissolved in an aqueous solution of HCl in the proportion of 5 grams of polymer per 100 cc. of the solution which was sufficient to effect complete neutralization of the polymer. A sample of washed cotton duck was thoroughly wetted by immersion in the polymer solution, squeezed to remove the excess solution, washed with 0.05 N sodium hydroxide solution, leached for 24 hours and dried at 60° C. After a soil burial test of 30 days' duration, the fabric was partially disintegrated and was severely attacked by fungus. It was only slightly better than the untreated fabric.

This case is related to my applications entitled "Fungicides, Their Preparation and Use," Serial Number 454,615, filed September 7, 1954, and "Protection of Materials From Parasitic Attack," Serial Number 453,123, filed August 30, 1954.

I claim:

1. The process for the preparation of a fungicidal reaction product comprising reacting a phenol which possesses fungicidal properties with a polymer of a monomer system comprising a compound having a structure selected from the group consisting of

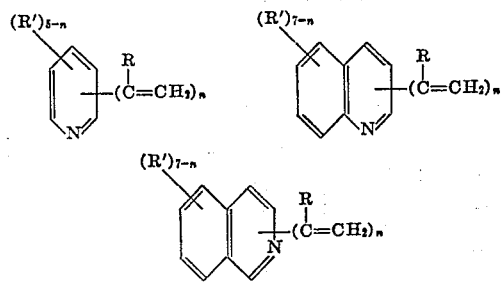

wherein $n$ is an integer selected from the group consisting of 1 and 2, each R is individually selected from the group consisting of H and $CH_3$, and each R' is individually selected from the group consisting of hydrogen, alkyl, nitro, alkoxy, halo, hydroxy, cyano, aryloxy, aryl, haloalkyl, alkaryl, hydroxyaryl, not more than 12 carbon atoms being present in the total of said R' groups.

2. Process of claim 1 wherein the reaction is effected by mixing an acidic solution of the polymer with an aqueous solution of an alkali metal salt of the phenol.

3. A process for the preparation of a fungicidal impregnant comprising mixing an acidic solution of a 1,3-butadiene/2-methyl-5-vinyl-pyridine polymer with sufficient aqueous solution of disodium 2,2'-methylene-bis(4-chlorophenol) to precipitate an insoluble complex of the two reactants.

4. A fungicidal composition of matter comprising a reaction product of a phenol which possesses fungicidal properties and a polymer of a monomer system comprising a compound having a structure selected from the group consisting of

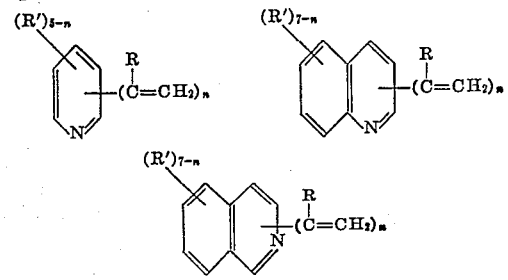

wherein $n$ is an integer selected from the group consisting of 1 and 2, each R is individually selected from the group consisting of H and $CH_3$, and each R' is individually selected from the group consisting of hydrogen, alkyl, nitro, alkoxy, halo, hydroxy, cyano, aryloxy, aryl, haloalkyl, alkaryl, hydroxyaryl, not more than 12 carbon atoms being present in the total of said R' groups, said reaction product being precipitated by mixing a solution of the phenol with a solution of the polymer.

5. A fungicidal composition of matter according to claim 4 wherein said reaction product is formed as a water-insoluble precipitate by mixing an acidic solution of a substituted pyridine polymer with an aqueous solution of disodium 2,2'-methylene-bis(4-chlorophenol).

6. Composition of claim 5 wherein the polymer is a copolymer of 1,3-butadiene and 2-methyl-5-vinylpyridine.

7. Composition of claim 5 wherein the polymer is a homopolymer of 2-methyl-5-vinylpyridine.

8. Composition of claim 5 wherein the polymer is a copolymer of 1,3-butadiene and 2-vinyl-5-ethylpyridine.

9. Composition of claim 5 wherein the polymer is a homopolymer of 2-vinylpyridine.

10. Composition of claim 5 wherein the polymer is a copolymer of 1,3-butadiene and 2-vinylpyridine.

11. A process for treating a textile to render it waterproof and resistant to fungi and insects which comprises impregnating said textile with a phenol which possesses fungicidal properties and a polymer of a monomer system comprising a compound having a structure selected from the group consisting of

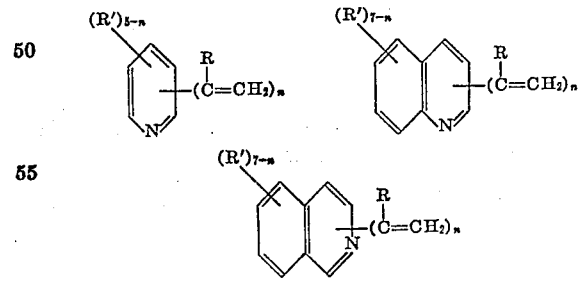

wherein $n$ is an integer selected from the group consisting of 1 and 2, each R is individually selected from the group consisting of H and $CH_3$, and each R' is individually selected from the group consisting of hydrogen, alkyl, nitro, alkoxy, halo, hydroxy, cyano, aryloxy, aryl, haloalkyl, alkaryl, hydroxyaryl, not more than 12 carbon atoms being present in the total of said R' groups, to deposit from 0.1 to 10 percent by weight of said product on the textile, based on the weight of the dry textile.

12. Process of claim 11 wherein the reaction product is precipitated in and on the textile by contacting the latter successively with two solutions, one of which is an acidic solution of the polymer and the other an aqueous solution of an alkali metal salt of the phenol.

13. A textile impregnated with the reaction product of a phenol which possesses fungicidal properties and a polymer of a monomer system comprising a compound having a structure selected from the group consisting of

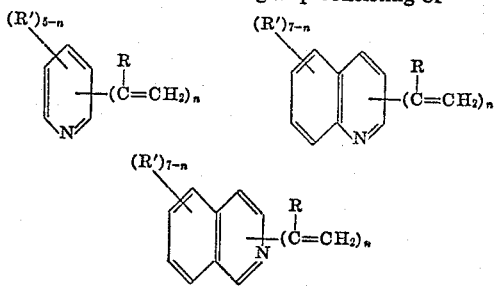

wherein $n$ is an integer selected from the group consisting of 1 and 2, each R is individually selected from the group consisting of H and $CH_3$, and each R' is individually selected from the group consisting of hydrogen, alkyl, nitro, alkoxy, halo, hydroxy, cyano, aryloxy, aryl, haloalkyl, alkaryl, hydroxyaryl, not more than 12 carbon atoms being present in the total of said R' groups, from 0.1 to 10 percent by weight of the water-insoluble reaction product being applied to the textile based on the dry weight of the latter, whereby the textile is made waterproof and resistant to fungi and insects.

14. The article of claim 13 wherein the reaction product is a water-insoluble complex of 2,2'-methylene-bis(4-chlorophenol) and a copolymer of 1,3-butadiene and 2-methyl-5-vinylpyridine.

15. The article of claim 13 wherein the reaction product is a water-insoluble complex of a homopolymer of 2-methyl-5-vinylpyridine and 2,2'-methylene-bis(4-chlorophenol).

References Cited in the file of this patent
UNITED STATES PATENTS

| | | |
|---|---|---|
| 2,457,738 | Scott | Dec. 28, 1948 |
| 2,503,209 | Nyquist | Apr. 4, 1950 |
| 2,702,763 | Pritchard | Feb. 22, 1955 |

OTHER REFERENCES

Elderfield Heterocyclic Compounds (1950), volume 1, page 412. Copy in D. W. 6.

Chemical Abstracts, volume 37, page 3757 (1943). Copy in Science Library.